UNITED STATES PATENT OFFICE.

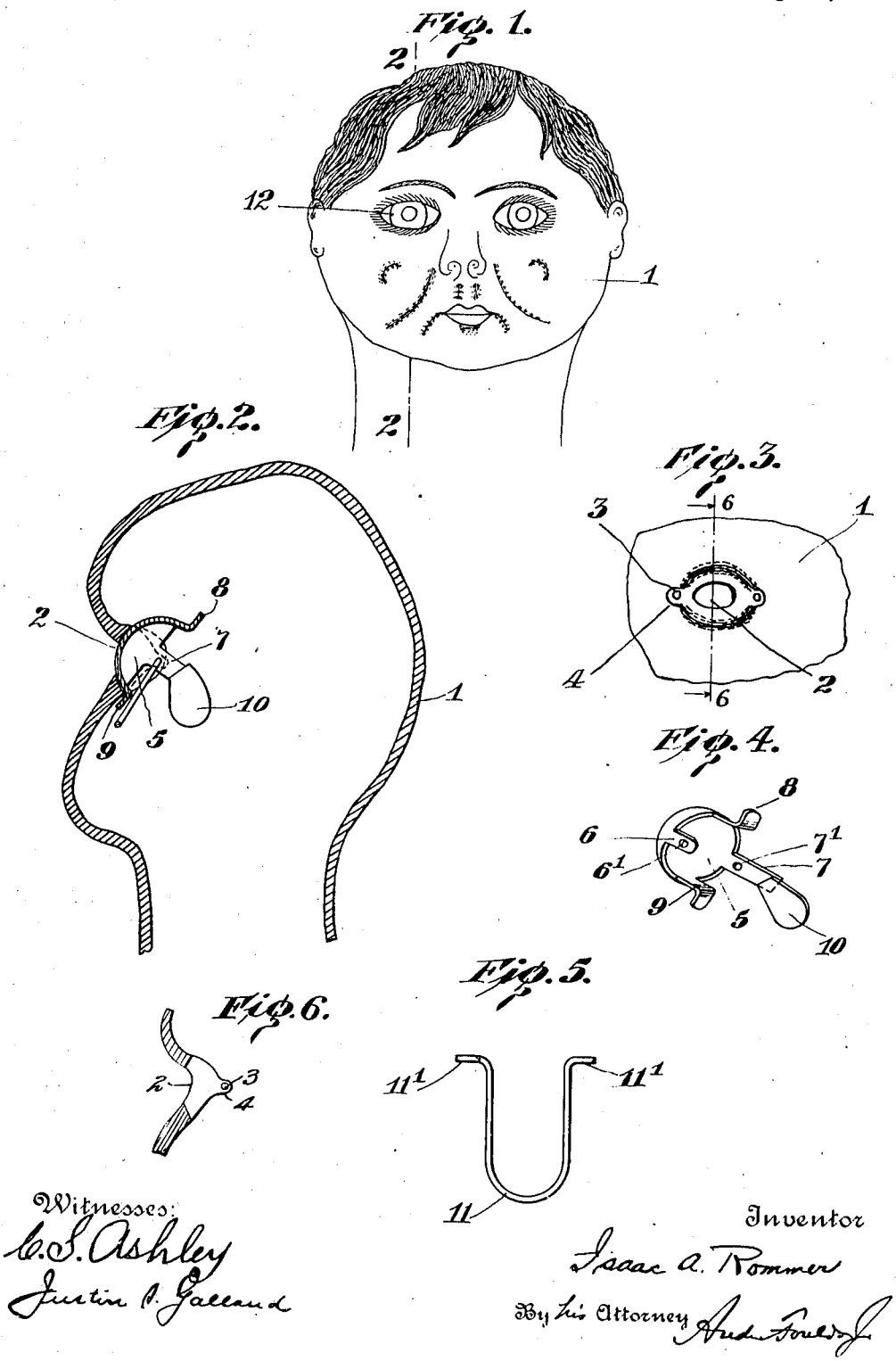

ISAAC A. ROMMER, OF NEW YORK, N. Y.

DOLL-HEAD.

1,149,858.  Specification of Letters Patent.  Patented Aug. 10, 1915.

Application filed December 11, 1914. Serial No. 876,749.

*To all whom it may concern:*

Be it known that I, ISAAC A. ROMMER, a citizen of the United States, residing in the borough of Brooklyn, city of New York, in the county of Kings and State of New York, have invented certain new and useful Improvements in Doll-Heads, of which the following is a specification, reference being had therein to the accompanying drawing.

My invention relates to improvements in doll heads, and the object of my invention is to provide a doll head with movable eyes in which the eyes may be readily removed and replaced. I accomplish this object by the device illustrated in the accompanying drawings in which—

Figure 1 is a perspective view of the head, Fig. 2 is a section of the same on the line 2—2 in Fig. 1, Fig. 3 is a detail of the eye socket, Fig. 4 is a view of the eye, Fig. 5 is a view of the spring clip, and Fig. 6 is a vertical section of the eye-socket on the line 6—6 in Fig. 3.

Similar characters refer to similar parts throughout the several views.

In a doll head 1 I provide eye apertures 2 each having sockets 3 formed in the walls thereof at each side of the eye aperture socket for which purpose I construct a protuberance 4 at the sides of the eye apertures 2 integral with the walls of the head 1. The eyeball 5 may be stamped out of sheet metal or may be constructed in any other desired manner. On the eye 5 I provide two ears 6 and 7 at each side, and at the top and bottom respectively I provide lugs 8 and 9 to limit the field of movement of the eye 5. On the ear 7 of the eye 5 I provide a weight 10 which serves to hold the eye in its normal position when the head is upright. The ears 6 and 7 are provided with apertures $6^1$ and $7^1$ to register with the sockets 3 in the wall of the head 1. The eye 5 is held in position in the head by means of a spring clip or bail 11 having its end sections $11^1$ bent outwardly. The eye 5 is placed in the eye aperture 2 with the apertures $6^1$ and $7^1$ respectively registering with the sockets 3 and the bent over end sections $11^1$ of the spring clip or bail 11 are sprung into the sockets 3 through the apertures $6^1$ and $7^1$ in the ears 6 and 7 of the eye 5 and thereby serve as pivots upon which the eye 5 swings.

When the head 1 is in an upright position, the weight 10 will cause the eye 5 to swing or turn on the pivots $6^1$ and $7^1$ bringing the lug 9 on the lower side of the eye 5 against the inner wall of the head 1 and exposing through the eye aperture 2, the lower side of the face of the eyeball 5 on which is painted or otherwise provided the representation of a pupil 12. The upper side of the face of the eyeball 5 is blank and preferable of a flesh color to represent the eye lid. When the head 1 is inclined rearwardly the weight 10 will cause the eyeball 5 to swing on the pivots $11^1$ thus exposing through the eye apertures 2 the upper or blank face of the eyeball 5 giving the effect or appearance of a closed eye.

Having thus described my invention what I claim is:

1. A doll head having eye apertures, sockets adjacent the eye apertures formed in the wall of the head, an eyeball provided with ears, a weight upon the eyeball, a spring clip having end sections bent outwardly and adapted to engage the said ears and to rest in the said sockets substantially as shown and described.

2. A doll head having eye apertures, interior integral protuberances formed in the head adjacent the eye apertures, sockets therein, an eyeball, provided with ears, a spring clip having end sections bent outwardly and passed through said ears and resting in the said sockets, substantially as shown and described.

3. A doll head provided with eye apertures, having an integral socket section adjacent the eye apertures, a socket therein, an eyeball provided with ears, a spring clip having end sections bent outwardly and passed through said ears and resting in said sockets, substantially as shown and described.

In testimony whereof I hereunto affix my signature in the presence of two witnesses.

ISAAC A. ROMMER.

Witnesses:
 JUSTIN S. GALLAND,
 LILLIAN H. BROWN.